United States Patent
Clements

[19]

[11] Patent Number: 5,835,640
[45] Date of Patent: Nov. 10, 1998

[54] METHOD AND APPARATUS FOR IDENTIFYING AND FIXING HORIZONTAL AND VERTICAL LINES IN DIGITIZED IMAGES

[75] Inventor: John Clements, San Francisco, Calif.

[73] Assignee: Seiko Epson Corporation, Tokyo, Japan

[21] Appl. No.: 433,127

[22] Filed: May 3, 1995

[51] Int. Cl.$^6$ .................................................. G06K 9/32
[52] U.S. Cl. ........................................................ 382/289
[58] Field of Search .................................. 382/289, 258, 382/269, 266, 205, 316, 195, 202, 203, 209, 256, 286, 268, 295

[56] References Cited

U.S. PATENT DOCUMENTS

| | | | |
|---|---|---|---|
| 4,010,446 | 3/1977 | Kawa | 382/258 |
| 4,517,604 | 5/1985 | Lasher et al. | 358/261.1 |
| 4,533,959 | 8/1985 | Sakurai | 382/289 |
| 4,791,679 | 12/1988 | Barski et al. | 382/269 |
| 5,054,102 | 10/1991 | Gaborski | 382/258 |
| 5,129,012 | 7/1992 | Abe | 382/190 |
| 5,153,748 | 10/1992 | Moyer | 358/443 |
| 5,253,338 | 10/1993 | Tanaka | 395/161 |
| 5,291,561 | 3/1994 | Tanaka et al. | 382/202 |
| 5,410,614 | 4/1995 | Chou et al. | 382/266 |
| 5,412,742 | 5/1995 | Takasaki et al. | 382/203 |
| 5,471,550 | 11/1995 | Kurachi | 382/289 |
| 5,537,490 | 7/1996 | Yukawa | 382/266 |
| 5,579,414 | 11/1996 | Fast et al. | 358/447 |

OTHER PUBLICATIONS

Cormen et al., *Introduction to Algorithms* (1990).

Yamada et al., Document Image Processing Based on Enhanced Border Following Algorithm, 1990, IEEE, pp. 231–236.

*Primary Examiner*—Yon J. Couso
*Attorney, Agent, or Firm*—Eric B. Janofsky

[57] ABSTRACT

Apparatuses and methods are provided for locating and straightening horizontal and vertical lines in digitized documents by first identifying horizontal or vertical elements, each of which may represent part of a longer line, according to several adjustable criteria. This approach confines use of precise, computationally intensive line-fixing routines to image regions likely to contain a line. In one aspect, the invention performs pixel-by-pixel scanning only in those regions likely to contain a line segment. Given a threshold number of pixels defining the smallest possible line segment, the invention begins with an initial pixel and tests the pixel linearly displaced therefrom by a distance equal to the threshold. If the displaced pixel is uncolored, a consecutive threshold-length run of colored pixels cannot exist between the initial and displaced pixels, so all of these pixels are considered evaluated and the displaced pixel becomes a new initial pixel. If both the initial and displaced pixels are colored, the invention examines a series of pixels progressively closer to the initial pixel; if any of these is found to be uncolored, it is defined as a new initial pixel, once again skipping over intervening pixels.

44 Claims, 8 Drawing Sheets

METHOD AND APPARATUS FOR IDENTIFYING AND FIXING HORIZONTAL AND VERTICAL LINES IN DIGITIZED IMAGES

FIELD OF THE INVENTION

This invention relates to digital document processing, and in particular to methods for detecting and straightening horizontal and vertical lines in digitally represented documents.

BACKGROUND OF THE INVENTION

Digitized images, particularly those obtained directly from source documents using optoelectronic scanners, often contain imperfectly rendered lines. This circumstance can arise, for example, when a document bearing text and graphic information is misaligned with the scanner, resulting in production of a digitized image in which lines that ran true on the document appear slanted or "staircased." It can also arise as a consequence of normal, though imperfect, scanner operation.

A scanner optoelectronically transforms text and/or image patterns present on an input document into electrical signals. Appropriate software processes these electrical signals into a "raster" of picture elements, or "pixels," for storage in a memory array organized into a grid having a plurality of rows and columns. The pattern of pixels in the raster corresponds to the appearance of the original scanned document. For example, current facsimile machines often scan at 200 dots/inch, with the result that a line one point ($1/72$ inch) thick will be represented by two to three pixels.

In the simplest form of raster format, each pixel is a single, bilevel bit corresponding to a colored or uncolored point in the digital representation. When transferred to a binary output device such as a printer, each pixel specifies a unique geometric location on an output medium, and, depending on whether the pixel is uncolored (value=1) or colored (value=0), the printer either applies a small colored dot at this location or leaves it blank. In more complex systems, each pixel is represented by multiple bits that quantize a tonal value from the original image.

If the scanner is misaligned with respect to the source document, otherwise straight lines obviously will not correspond to even rows and/or columns of pixels. However, even if the document is properly aligned, folds in the document, dust, smudges and dirt can interrupt scanning of a line and cause generation of an imperfect bitmap. In addition, virtually all scanners tend to exhibit some erratic behavior, introducing random gaps and variations in line thickness during the course of a scan. More severe optical imperfections in the scanner can result in imposition of spurious.

To rid digitized documents of these unwanted variations and restore the straight lines as originally intended, a variety of techniques have been developed. These are frequently employed in software packages that not only straighten lines, but exhaustively categorize the elements of a scanned page, grouping pixels together into meaningful objects consisting of lines, curves and shapes. In other cases, line-straightening techniques are used to eliminate lines so as to better facilitate recognition of textual information.

Thus, many current techniques of line recognition and straightening tend to exist as part of larger systems, and may therefore operate somewhat inefficiently on lines alone; for example, such systems usually employ multiple-pass methods that repeatedly analyze a digitized document for a variety of primitive elements in addition to lines. Moreover, such generalized systems may as a result of their very generality ignore certain cues particular to lines. For example, an optical character recognition system, which transforms digitized images into text, may misclassify a slanted line as a proper curve, or may not be programmed to recognize the particular variations and spurious artifacts that attend document digitization using typical scanners.

DESCRIPTION OF THE INVENTION

Summary of the Invention

The present invention is designed to efficiently scan a digitized document solely to detect horizontal and vertical lines, determine their lengthwise extents, and straighten them. The invention processes the document only twice, once to detect and erase sets of pixels corresponding to horizontal lines, and again to detect and erase sets of pixels corresponding to vertical lines. As lines are detected, the invention accumulates data relating thereto (including average thickness and endpoints), and utilizes these to reconstruct a straight version of the line that it introduces into the document. Detected lines are thereby "coerced" to a uniformly horizontal or vertical orientation.

In operation, the invention first identifies horizontal or vertical line segments—that is, elements that may actually represent part of a longer line—according to at least three criteria: first, that the potential segment contain a consecutive run of a certain minimum number of colored pixels; second, that the line fall within a preset thickness range; and third, that the segment display no more than a small degree of variation in thickness. The second and third criteria can be modified depending on the manner in which the document was obtained; for example, very small runs of excessive thickness may well be consistent with some types of scanners. This approach of identifying line segments before generating a more detailed specification of the lines of which they form a part provides obvious efficiency benefits, since it confines use of precise, computationally intensive line-fixing routines to image regions likely to contain a line.

The present invention facilitates replacement of the conventional approach to line-scanning—namely, examining the individual pixels of raster rows or columns for runs of consecutive colored pixels that exceed a predetermined threshold length—with a more efficient approach that reserves pixel-by-pixel scanning for those regions likely to contain a line segment. In particular, given a threshold number of pixels defining the smallest possible line segment, the invention begins with an initial pixel and tests the pixel linearly displaced therefrom by a distance equal to the threshold. If the displaced pixel is uncolored, a consecutive threshold-length run of colored pixels cannot exist between the initial and displaced pixels, so all of these pixels are considered evaluated and the displaced pixel becomes a new initial pixel. If both the initial and displaced pixels are in fact colored, the invention examines a series of pixels progressively closer to the initial pixel; if any of these is found to be uncolored, it is defined as a new initial pixel, once again skipping over intervening pixels. This approach is particularly useful for identifying vertical lines.

The line-fixing routines locate all pixels belong to the line, erase them, and return the dimensions of the detected lines for subsequent redrawing. Detected horizontal line segments are preferably processed in a high-speed cache memory or register bank; a discrete portion of the source document that includes part of a line segment is loaded in byte-length chunks into the cache for processing, and then, following processing, is returned to the main memory in a similar fashion as new data, representing a contiguous portion of the line segment, enters the cache. In this way, the cache operates as a "window" onto the most salient portions of main memory, allowing the central processor to execute the line-fixing routines only on those portions and avoiding pixel-by-pixel operations on the relatively slow main memory.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENTS

Figure 1:
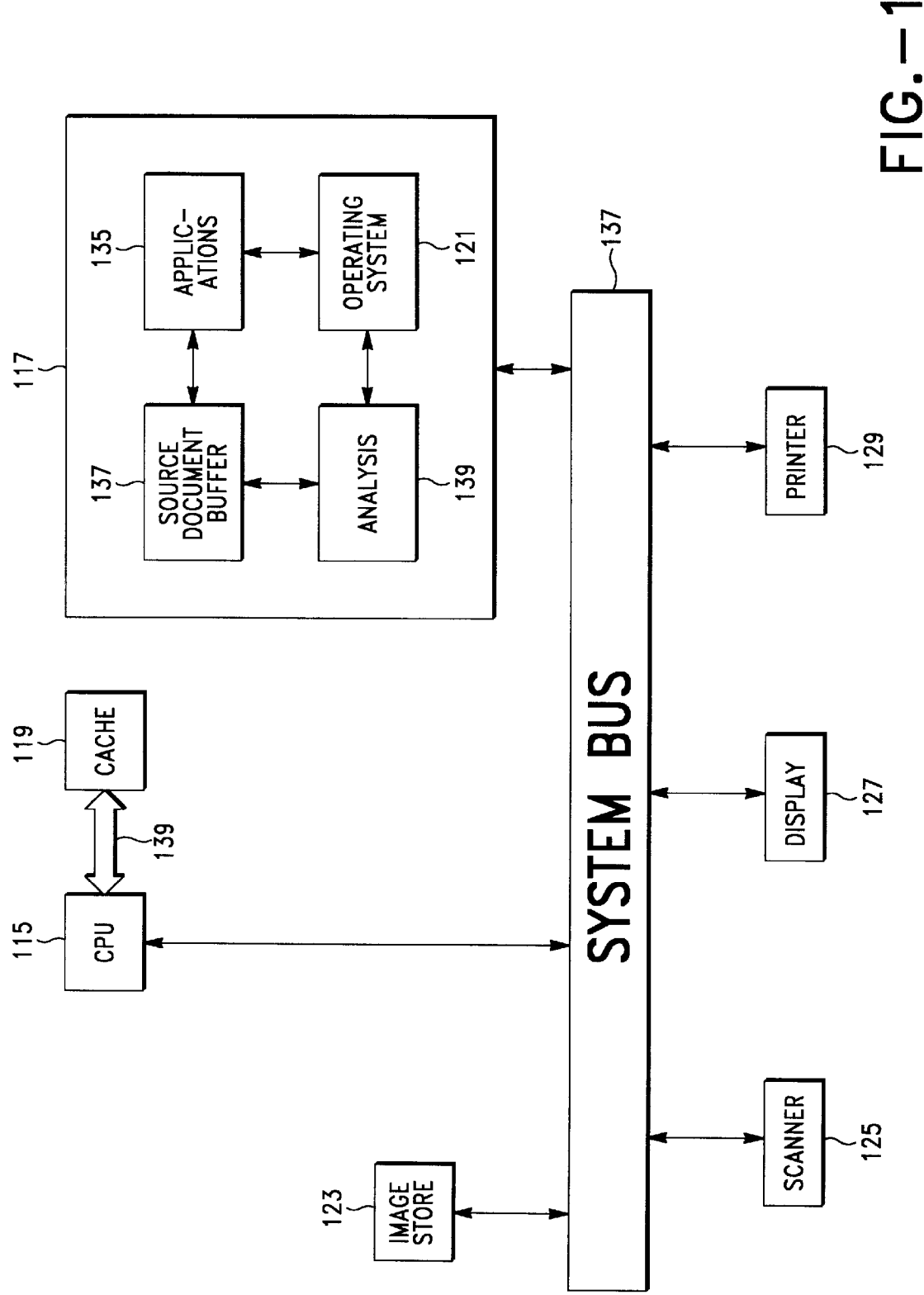
FIG. 1 schematically illustrates a representative hardware environment for the present invention.

Refer first to FIG. 1, which illustrates a representative hardware environment suitable for the present invention. The depicted computer system includes a central-processing unit 115, which performs operations on and interacts with a computer memory including a system memory 117 and a cache memory 119. System memory 117 typically includes volatile or random-access memory (RAM) for temporary storage of information, including portions of the computer's basic operating system 121. The system typically also includes read-only memory (ROM) for permanent storage of the computer's configuration and additional portions of the basic operating system 121, and at least one mass storage device such as a hard disk and/or CD-ROM drive 123 for storing, inter alia, images to be processed.

The system also includes several peripheral devices for accepting information from and presenting information to the user. These include a scanner 125, which optoelectronically converts text and/or image patterns present on an input document into electrical signals; a video display 127; and a printer 129. Operation of these components is governed by a series of application programs 135 contained system memory 117; for example, the electrical signals generated by scanner 125 are processed by an optical character recognition package or an image-processing program, and printer 129 may operated by driver programs stored in memory 117. As used herein, the term "application program" refers broadly to any body of functionality for processing information of interest to the user and which involves pixel operations. All components of the system other than memory cache 119 communicate over a bidirectional system bus 137. Cache 119 communicates directly with CPU 115 over a local bus 139. In an alternative design, the function of cache 119 is performed by a sufficiently large series of local registers accessible to CPU 115.

Of primary interest with regard to the present invention are image-processing programs that reduce text, graphics or images (obtained, for example, from scanner 125) into a digital format for storage in a computer memory. For simplicity, the following discussion assumes that the image is present in the form of binary pixels that specify either a blank space or a monochromatic dot; this mode of operation in fact represents an optimum implementation of the invention, offering the most significant performance improvements. In the illustrated system, the "bitmap" raster defined by an application 135 is stored in a document buffer 137. Buffer 137 is ordinarily a partition of system memory organized into a "bitwise" grid to accommodate a raster.

Figure 2:
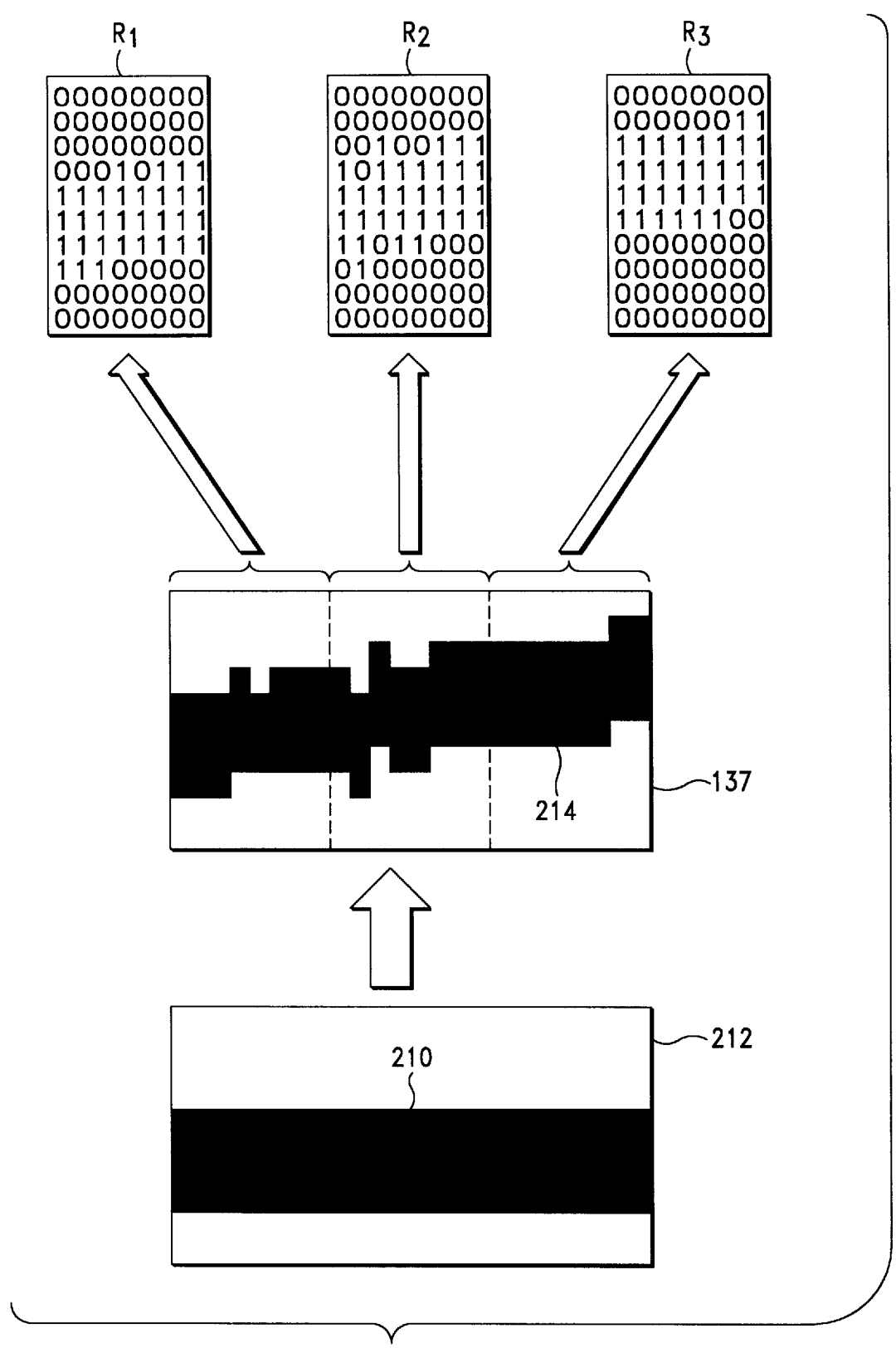
FIG. 2 schematically illustrates the manner in which a straight horizontal line may be misrepresented in a raster buffer, and the manner in which the present invention processes such a buffer.

In a representative mode of operation, a source document is scanned by scanner 125, processed into a raster by an application 135 and stored in buffer 137. Because of inaccuracies in the scanner, the application program or both, straight lines appearing in the source document may be represented imperfectly in buffer 137. This effect is illustrated in FIG. 2, where a straight line 210 present in a fragment 212 of a source document becomes distorted following scanning. In particular, the corresponding rasterized line 214 stored in buffer 137 is represented in thickness by an average of four pixels, but this thickness varies irregularly and the line wanders upward across the field the buffer. Idiosyncratic thickness variation can be due to erratic scanner performance, while line wander can occur as a result of slight misalignment of the document with respect to the scanner. Other artifacts can include spurious gaps that interrupt what should be a contiguous line, and random thickness variations.

Figure 3A:
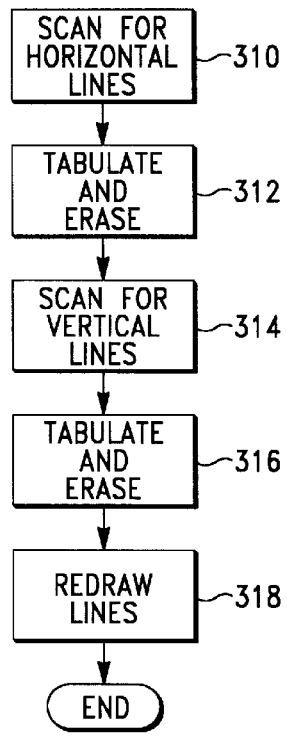
FIG. 3A is a flow chart indicating the basic operation of the invention.
Figure 3B:
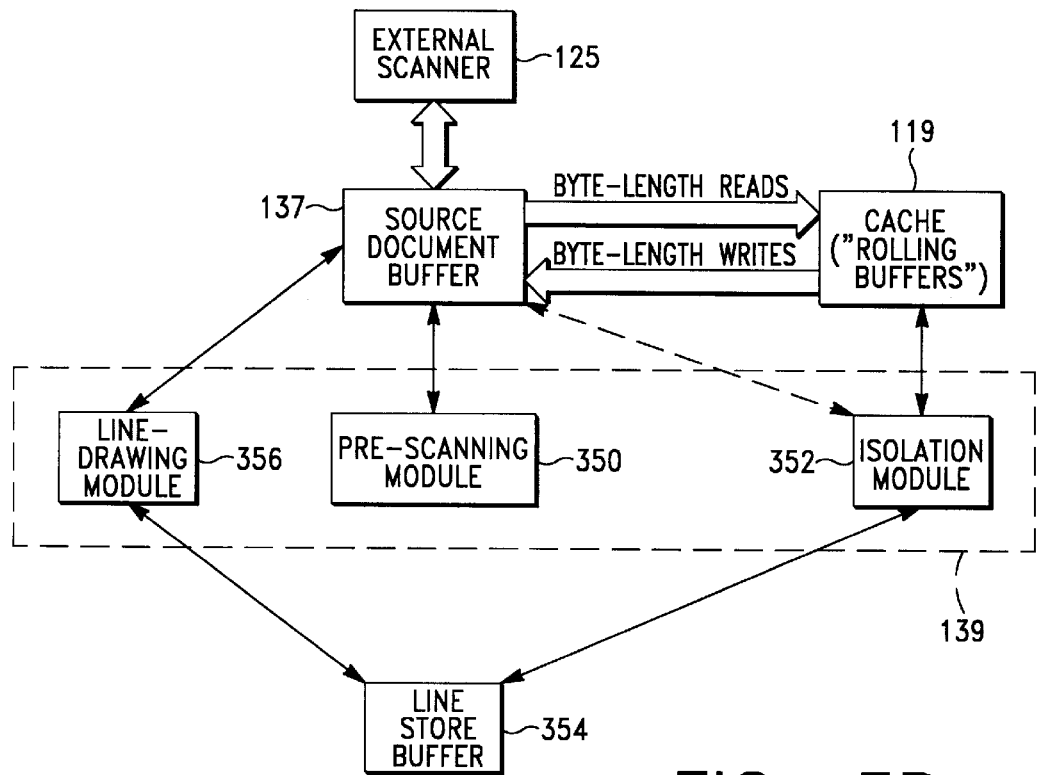
FIG. 3B illustrates in greater detail the components of the analysis portion of the invention, the operation of which is indicated in FIG. 3A.

The present invention, implemented, in the illustrated computer system, in an analysis engine 139, fixes lines in a three-stage process set forth generally in FIG. 3A; the various components of analysis engine 139 responsible for the various process steps are shown in FIG. 3B. With reference to both figures, in a first step 310 the image residing in buffer 137 is scanned by a prescanning module 350 for the presence of groups of contiguous colored pixels corresponding, according to predetermined criteria, to horizontal lines. In a subsequent step 312, an isolation module 352 tabulates the grid positions of pixels satisfying the criteria and then "erases" the pixels (i.e., renders the pixels uncolored by resetting them to zero value). The tabulation includes endpoints for the line and an average thickness, which are accumulated and stored in a memory partition or buffer 354. A similar set of procedures is repeated for vertical lines in steps 314 and 316, with the tolerance of the scanning routine for pixel gaps increased in recognition of the fact that all horizontal lines, which may intersect with vertical lines, have been erased. In a final step 318, a line-drawing module 356 draws perfectly straight (i.e., margin-justified) lines between the tabulated endpoints stored in buffer 354, with thicknesses corresponding to the tabulated average scanned-line thicknesses, by setting to value=1 appropriate rows of pixels.

The manner in which step 310 is executed is not critical; any standard line-following algorithm, which detects runs of horizontally contiguous, colored pixels no thicker than a preset amount (i.e., spanning no more than a preset number of vertical rows) and varying in thickness no more than a preset amount, will suffice. The maximum thickness ordinarily depends on the scanning frequency, so that this maximum corresponds to a true source-document line thickness and not an arbitrary number of pixels. Regions having persistent (i.e., over a run of several pixels) thicknesses in excess of the maximum probably do not correspond to lines, instead representing, for example, alphanumeric-character or image components. Similarly, pronounced variation in the thickness of a potential line probably does not result from scanner noise, the range of which tends to fall within predictable tolerance limits; instead, such variation probably signals a region of tonal image variation, the linear coalescence representing random statistical variation.

Figure 4:
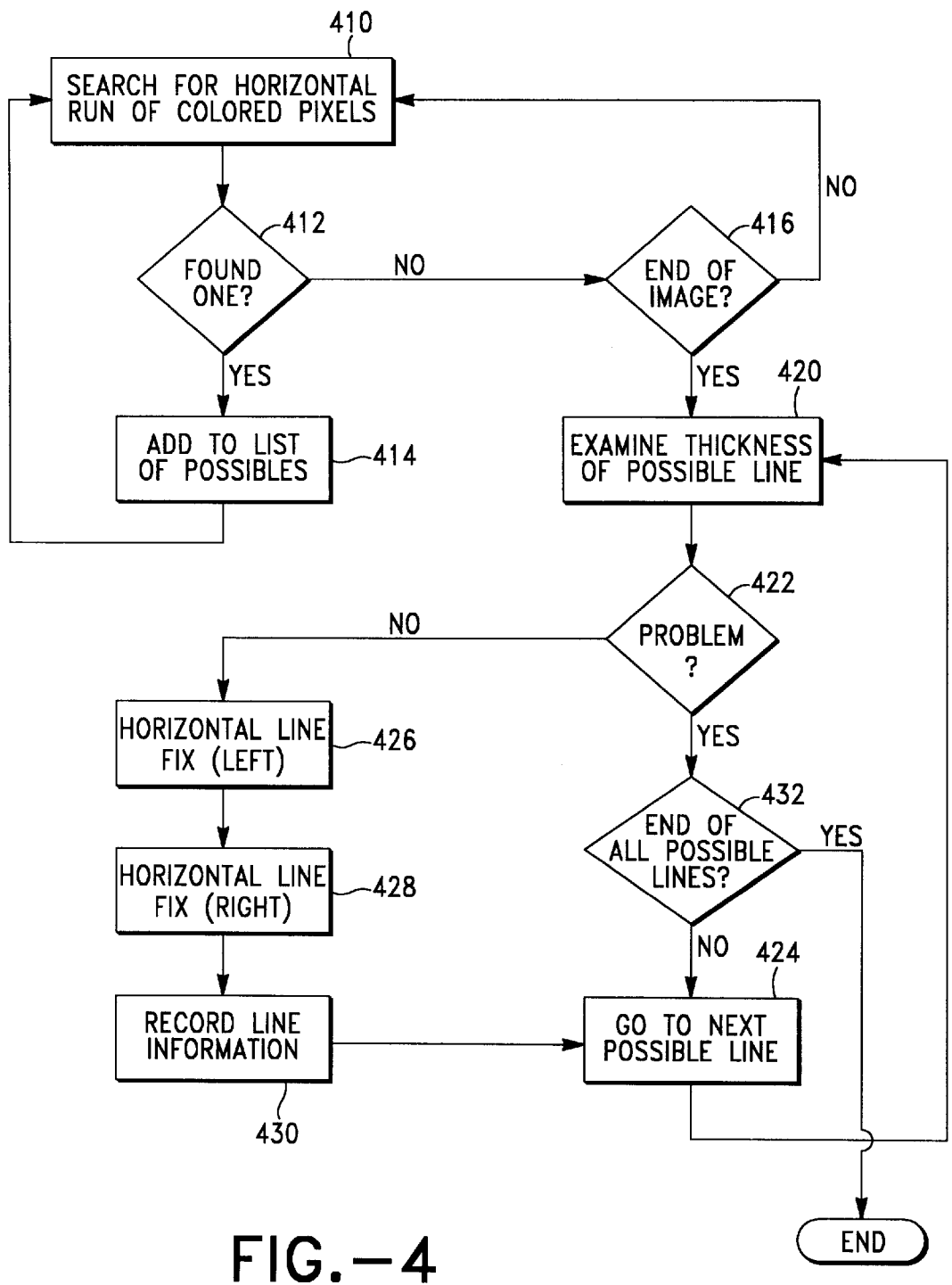
FIG. 4 is a flow chart illustrating the procedure utilized by the invention to detect horizontal lines in a digitized document.

A suitable procedure for locating and identifying possible horizontal lines appears in FIG. 4. In a first step 410, pre-scanning module 350 (via operation of CPU 115) sequentially scans rows of pixels in buffer 139 for runs of consecutive colored pixels exceeding a threshold number t. If a scanning step reveals such a run (step 412), it is preliminarily considered a line segment, module 139 records its bitmap location in a tabulation partition of system memory 117 (step 414). Otherwise, scanning is continued (step 414) until all pixels in buffer 137 have been examined (step 416). This procedure is generally encoded in assembly language to maximize speed of execution. In addition, because the raster is assumed to be a bilevel bitmap, the scanning procedure can examine a multi-bit byte of data with each instruction cycle. If the system utilizes an eight-bit byte, scanning is accelerated by a factor of eight as compared with pixel-by-pixel examination.

Analysis engine 139 then tests each located and recorded line segment against specified thickness criteria, such as absolute thickness and thickness variation. In step 420, isolation module 352 examines the thickness (i.e., vertical span of contiguous colored pixels) of each line segment at some or all points along its length to determine whether it falls within acceptable boundaries. Criteria specifying acceptable thickness and variation can be somewhat complex, varying, for example, with the number of consecutive pixels exceeding a maximum thickness (since very short runs of excessive thickness can be spurious and consistent with a valid line) and the lengthwise extent of excessive thickness variation. Nonetheless, such criteria are well-known to and easily implemented by those skilled in the art.

If a line segment fails to satisfy the criteria (step 422), it is deleted from the tabulation and the next line segment is evaluated (step 424). If, on the other hand, the line does satisfy the criteria, its endpoints are located and the line is straightened by executing the horizontal line-fixing procedure described below in the left (step 426) and right (step 428) directions. The endpoints and unitary thickness of the newly established line are recorded in the tabulation partition (step 430) for subsequent rendering, and the next line is evaluated. The procedure ends after the entire stored list of lines has been examined (step 432).

The line-fixing procedure of the present invention relies on the hardware configuration shown in FIG. 1 and the different access times associated with system memory 117 as compared with cache memory 119 (or local registers), the latter offering substantially shorter access times. The invention thus avoids iteratively processing pixels residing in buffer 137, since access thereto is slow, and instead operates on one or more "rolling" buffers in cache 119, each of which contains a portion of buffer 137. This is illustrated in FIG. 2, where, for purposes of presentation, pixels appear as colored and uncolored areas in buffer 137 and as numerals in the cache buffers. The depicted portion of buffer 137 consists of ten 24-bit rows (i.e., ten rows of each having 24 columns of bits). The number of rolling buffers employed to accommodate this amount of information depends on the size of a byte; the rolling buffers preferably have a number of columns equal to the number of bits in a byte, since this arrangement permits an entire buffer row to be loaded using a single memory transfer instruction. The number of rows in a buffer depends on the maximum allowable thickness, in bits, of a line; the buffer "height" (i.e., column size) should equal this maximum thickness. Assuming an eight-bit byte and a maximum average line thickness of five bits, the rolling buffers $R_1$, $R_2$ and $R_3$ are defined as 80-bit memories having ten rows of eight bits (one byte) each. Although it is possible (using, for example, multiple graphics processors) to process several buffers simultaneously, the ensuing discussion assumes for simplicity that a single buffer is employed, with $R_1$, $R_2$ and $R_3$ representing sequential states of that buffer.

Figure 5:
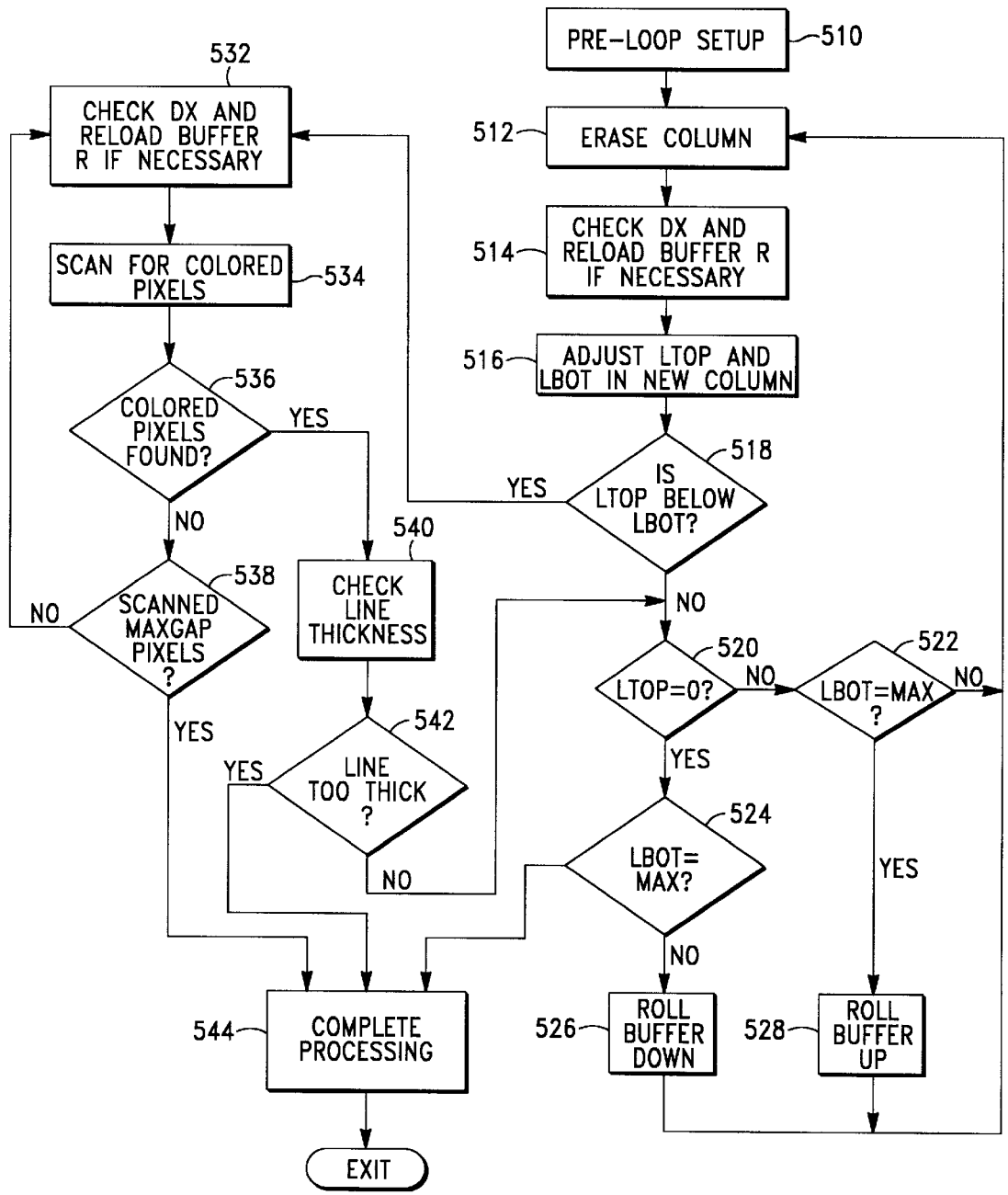
FIG. 5 is a flow chart illustrating the procedure utilized by the invention to establish horizontal-line orientation and erase detected lines in preparation for redrawing.
Figures 6A, 6B:
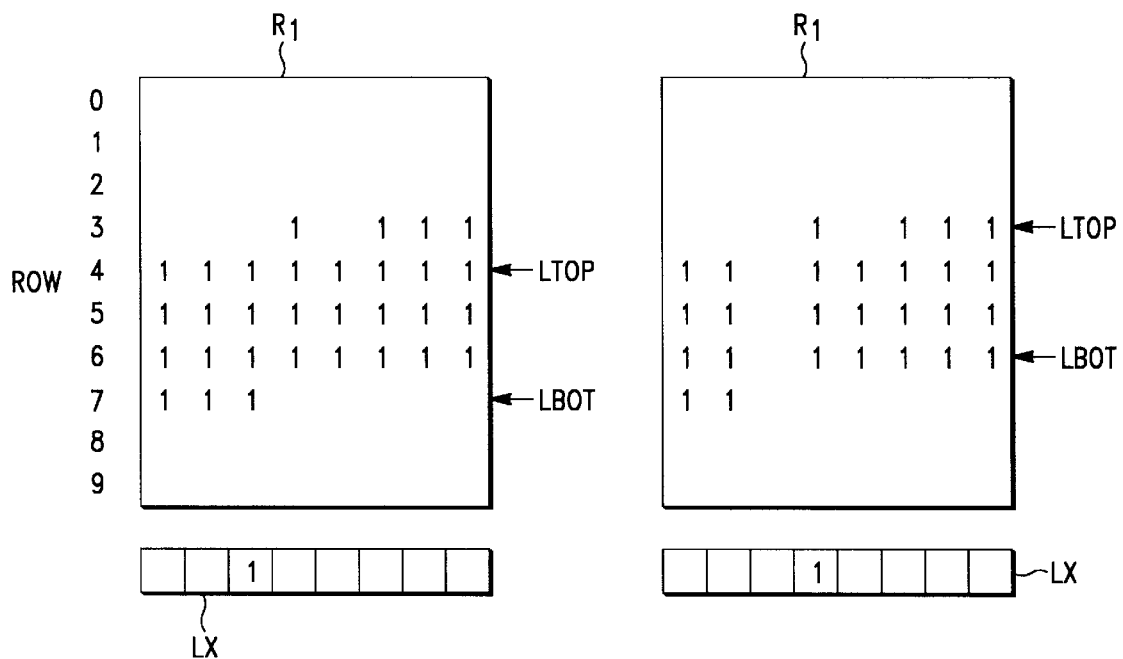
FIGS. 6A–6B schematically illustrate processing of a line contained in a rolling buffer.

The horizontal line-fixing operation of the present invention may be understood with reference to FIGS. 5 and 6A–6B, the latter figures depicting the state $R_1$ of cache 119. (For convenience of presentation, only colored pixels are identified in FIGS. 6A and 6B.) Basically, ten one-byte chunks of image data are copied from buffer 139 into the rolling buffer $R_1$; this data is processed and copied back into the portion of buffer 139 from which it was copied, replacing the unprocessed source data. Thus, 80 separate reads and writes to the inherently slow-access buffer 137 are replaced with 20 such operations (ten to fill buffer $R_1$ and ten to flush it); furthermore, the pixel-processing operations are much more quickly accomplished on pixels resident in cache memory 119 than those in buffer 137. These features combine to deliver an overall processing improvement of approximately five times relative to standard systems.

For the processing sequence shown in FIG. 5, isolation module 352 utilizes a single-bit directional register DX, the contents of which specify the direction of processing; a byte-length register LX, which acts as a local mask; and a pair of pointers LTOP and LBOT, which point to the top and bottom pixels, respectively, of a current rolling buffer column. These registers may be locations in cache 119 or internal to CPU 115.

The line-fixing operation begins at step 510, where a pre-loop setup routine loads rolling buffer $R_1$ from document buffer 137; sets LX to select the first column of the rolling buffer to be processed; locates, in the first column, values for LTOP and LBOT; and sets any further necessary initial variables. Suppose, for example, that the line to be fixed begins at a memory location corresponding to the third column of buffer $R_1$. In this case, LTOP points to row 4 and LBOT to row 7 of $R_1$, as shown in FIG. 6A. The third bit of local mask LX, corresponding to the third buffer column, is set and the remaining bits are left unset.

In step 512, the first column thickness of the line is erased. This is accomplished by successive logical NAND operations between LX and buffer $R_1$ for all bits lying between and including LTOP and LBOT. The thickness (i.e., height) of the erased column—namely, four bits—is recorded in memory, and in step 514, the set bit of LX is shifted in accordance with the direction specified in DX. Had the erase operation taken place in the final column of buffer $R_1$, the contents of the buffer would have been written back into the memory locations from which the initial contents were obtained, and the buffer reloaded with a new set of memory contents from document buffer 137.

In step 516, LTOP and LBOT are adjusted in accordance with the contents of the next pixel column (whose location is specified by DX). However, the line being erased is constrained to grow in thickness by no more than one pixel in each vertical direction. This dampening function prevents instantaneous response to spurious scanning artifacts; if the line continues to grow to the point where it exceeds the maximum allowable line thickness, isolation module 352 will declare an endpoint as discussed below. Thus, in searching the next column for succeeding values for LTOP and LBOT, isolation module 352 cannot move LTOP up nor LBOT down more than one pixel, even if colored pixels lie beyond these vertical positions. However, module 352 is not similarly constrained in the opposite directions; it is free to move LTOP down, and LBOT up, as many vertical positions as necessary to encounter a colored pixel. If, in searching for a colored pixel, LTOP and LBOT cross one another, as indicated in step 518, a blank vertical column is indicated; processing then continues as discussed below.

Figures 7A, 7B:
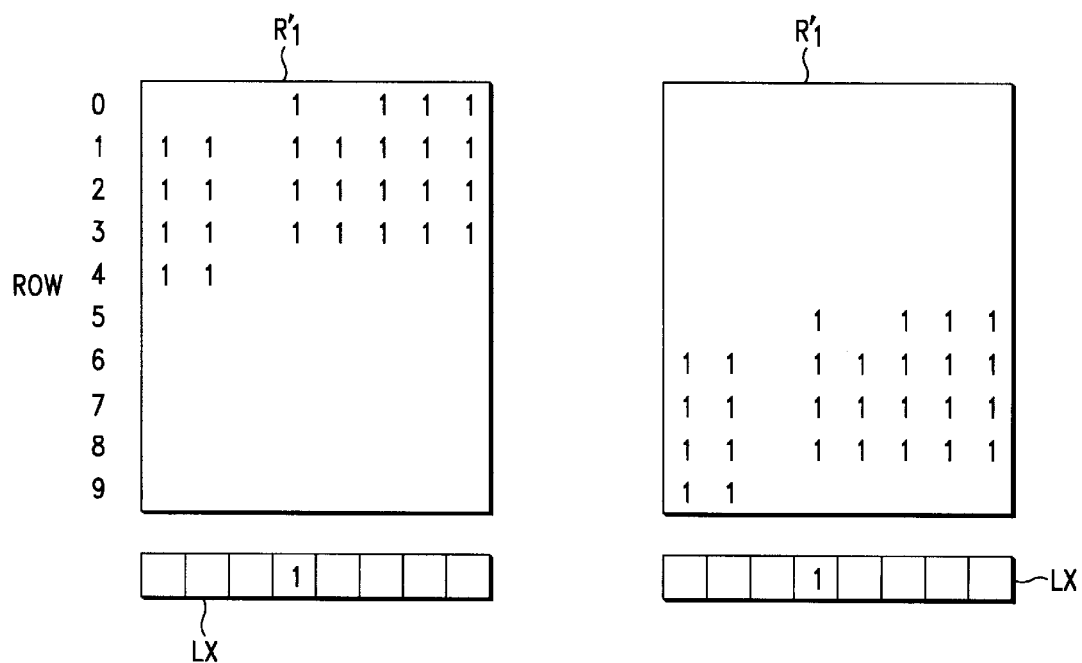
FIGS. 7A–7B schematically illustrate shifting of a rolling buffer to accommodate lines exceeding the range of the buffer.

If, on the other hand, colored pixels are found without triggering this condition, the line is assumed to continue as shown in FIG. 6B. LX now indicates the fourth column, and both LTOP and LBOT have shifted up one row. Because buffer $R_1$ essentially represents a horizontally translating local window to document buffer 137, it is possible that even a valid line varying in thickness or wandering vertically will eventually fall outside the window. Module 139 detects this condition when LTOP reaches row 0 (step 520) or LBOT sinks to the last row in buffer $R_1$ (step 522). If either condition occurs, the buffer is "rolled" unless LTOP has reached row 0 and LBOT has reached row 9 (step 524) in buffer $R_1$; in this case, if the number of rows in buffer $R_1$ just exceeds the maximum allowed thickness of a line, module 139 recognizes a too-thick line and, if this condition persists as discussed below, declares an endpoint. Rolling the buffer comprises reconfiguring its contents so that the line being followed no longer extends beyond the buffer's horizontal or vertical range. This is shown in FIGS. 7A–7B, wherein the contents of buffer $R_1$ occupy the upper portion of the illustrated buffer, designated $R_1'$, instead of the central portion as in FIGS. 6A and 6B. After completing erasure of the third column and proceeding to the fourth, isolation module 352 determines that the top pixel of the fourth column occupies row 0. Accordingly, since the bottom pixel is not in row 9, a downward roll is initiated at step 526. This involves flushing a sufficient number of rows from buffer $R_1'$ (by rewriting them back into document buffer 137) to allow the bottom pixel of column 4 to be shifted down to the penultimate bottom row (i.e., row 8) of buffer $R_1'$; the now-unoccupied upper rows whose contents have been shifted down are filled with corresponding portions of document buffer 137. (Moving the bottom pixel of column 4 all the way down to row 9 would precipitate an upward roll.) In other words, the position of the local window represented by the rolling buffer has been moved up, so its erstwhile contents have shifted downward.

Thus, as shown in FIG. 7B, rows 5–9 have been written back into memory, the contents of $R_1'$ shifted downward, and new data from memory loaded into rows 0–4. Although that data happens to be blank, and although no colored pixels were in fact written from $R_1'$ back into memory, such need not have been the case.

If the bottom pixel of any of the first three columns of buffer $R_1$ (FIG. 6A) had been located at row 9, the buffer would have been rolled up (step 528) instead of down. For an upward roll, the actions described above are reversed; the buffer is reconfigured such that the uppermost pixel of the active column (whose bottom pixel occupied row 9) has been shifted to up row 1. Following a roll in either vertical direction, the preceding processing steps, beginning with column erasure in step 512, are repeated.

Step 518 preferably detects possible endpoints by noting crossing of LTOP and LBOT, as discussed above; alternatively, if the resolution of the scanning device is sufficiently high, it is possible to detect distances between LTOP and LBOT that fall below a minimum distance (corresponding to a thickness too small to correspond to a valid line). If a possible endpoint is detected, a procedure is performed to ensure that it is truly an endpoint and not the result of scanner error. This procedure represents a modified version of steps 514–528. In a first step 532, the next column in the direction specified by DX is identified and the rolling buffer reloaded if that column extends beyond the buffer range. In step 534, a narrow band of pixel locations projecting beyond the first detected blank pixel is examined for the presence of colored pixels. The width (in columns) of the band corresponds to the maximum allowable gap, i.e., the greatest distance that might be attributable to scanner operation; generally, this distance is to 2–3 pixels. Scanning is accomplished by iteratively examining horizontally contiguous pixels (step 538) until the maximum gap width (or a colored pixel therein) is reached.

If a colored pixel is found within this gap (step 536), the pixels above and below the detected pixel are examined in step 540. If the thickness (columnar height) of colored pixels at this point is consistent with the thickness of the line preceding the detected gap, the main processing loop is re-entered at step 520. If not, the new pixels, even though close to the end of a line, probably do not represent continuation of that line; instead, the gap may simply separate the end of a line from a character or graphic. In this case, module 139 records the last column of colored pixels (i.e., the column before a blank column or insufficient line thickness was detected) as an endpoint.

Similarly, if no colored pixels are found within the gap (step 538), the identification of a possible endpoint is confirmed. In step 544, control is passed to the horizontal scanning procedure shown in FIG. 4, which records the location of the endpoint in document buffer 137 along with the thickness of the line at this point. Also recorded is an average line thickness (i.e., height of erased pixels). At step 428, DX is set to the opposite direction, and the process illustrated in FIG. 5 repeated in the opposite direction beginning with the first column in the original line segment, thereby completing processing of the line of which the line segment is a part, and identifying both endpoints thereof.

After all line segments have been processed, the image is left with all pixels corresponding to horizontal lines erased. As indicated in FIG. 3, the invention continues by scanning vertical lines at step 314.

Figure 8:
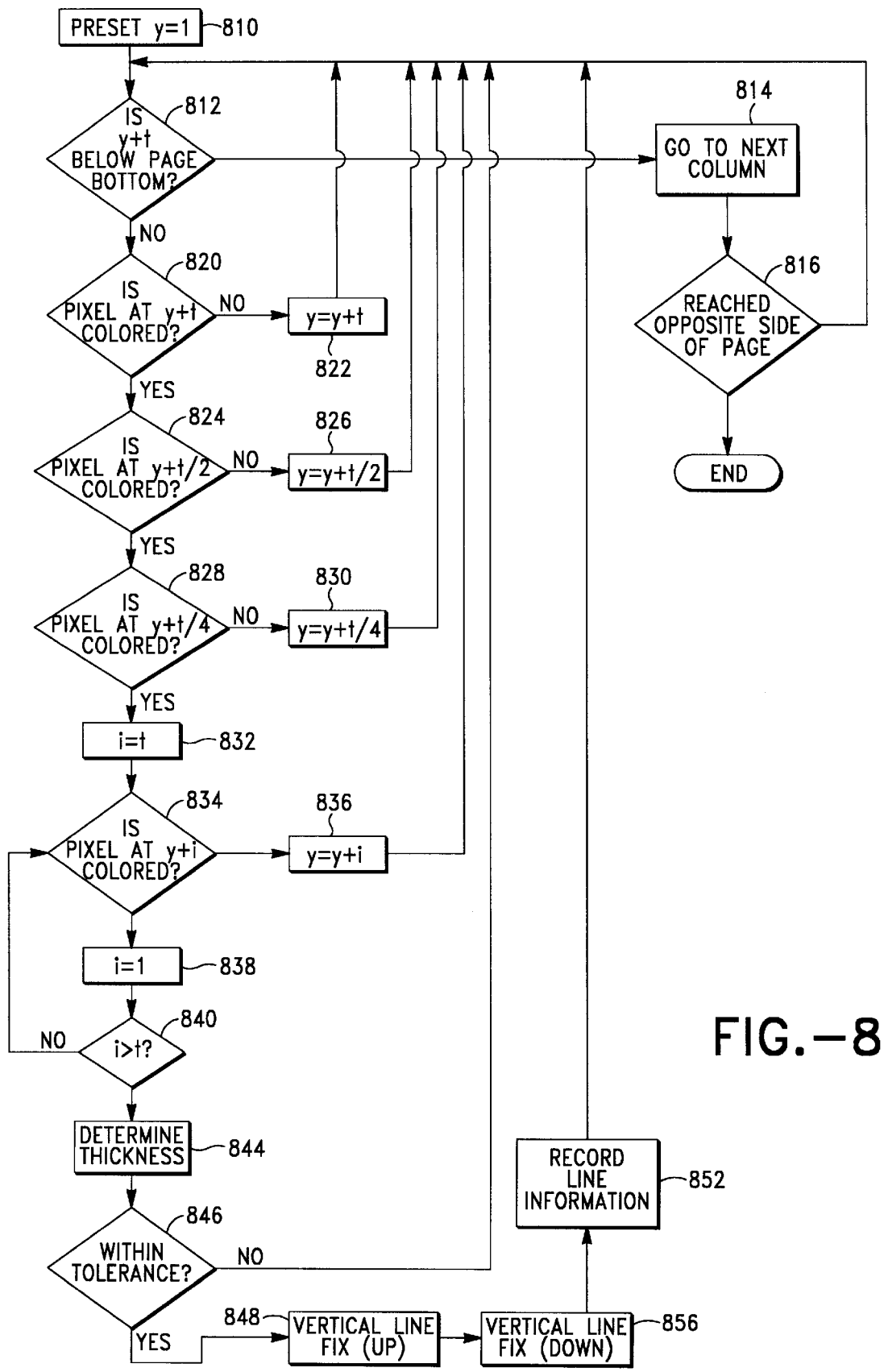
FIG. 8 is a flow chart illustrating the procedure utilized by the invention to detect vertical lines in a digitized document.

Vertical lines are identified by the vertical scanning procedure shown in FIG. 8; it should be understood, however, that while this routine provides particular efficiency benefits in the case of vertical lines, it is equally applicable to detection of horizontal lines. Although this procedure cannot exploit the byte-at-a-time processing efficiency of the horizontal line-fixing procedure discussed above, it does improve on the sequential, bit-by-bit examination characteristic of the prior art. The line-scanning procedure employs a thresholding technique whereby vertical runs of pixels falling below a predetermined minimum (generally 1/20 inch, which in a 300 dotper-inch scan corresponds to 15 pixels) are considered insufficient to constitute part of a vertical line. The present invention recognizes that if a first pixel is uncolored, and a second pixel, vertically displaced from the first pixel by a distance at least equal to the predetermined minimum is also uncolored, then a run of vertically consecutive, colored pixels in excess of that minimum cannot exist between the first and second pixels. Accordingly, the procedure employs the fundamental invariant that, for downward scanning, the pixel at vertical position y is uncolored, and furthermore that no string of colored pixels of threshold length t is contained in the vertical string of pixels above y. (For horizontal lines, the invariant is that the pixel at horizontal position x is uncolored, and furthermore that no string of colored pixels of threshold length t is contained in the horizontal string of pixels past x in the direction of scanning.)

In a first step 810, an initial vertical starting position y is identified; the value associated with a pixel corresponding to this position is set to −1, meaning that, for purposes of analysis, the pixel does not exist; this ensures initial satisfaction of the invariant. In step 812, the pixel vertically displaced from y by a distance t is examined to determined whether, first, it falls below the bottom of the page. If so, all possible line segments have been identified for the current column, and the procedure moves to the next column (step 814) unless it has reached the horizontal end of the page opposite from where the procedure commenced (step 816); if this is the case, the document has been fully scanned for vertical lines and the procedure ends.

If, however, the position y+t is within the image frame, the pixel at that location is examined to determine whether it is colored or uncolored (step 820). If not, then a colored segment of vertical length t cannot exist between y and y+t; therefore, y is moved to y+t (step 822), and processing recommences at step 812. On the other hand, if the pixel at y+t is colored, the possibility exists that a vertical stretch of colored pixels of the necessary minimum length is contained in the segment y+t. Prescanning module 350 tests for this possibility using an iterative loop that extends the foregoing logic to postpone sequential pixel examination until diminishing returns render this optimal from an efficiency perspective. In step 824, the pixel at position y+t/2 is examined; if it is uncolored, y is moved to y+t/2, and processing begins again at step 812. This iterative process is repeated n times, such that the pixel at each position $y+t/2^n$ is successively examined, and the value $t/2^n$ is added to y when an uncolored pixel is identified. In the preferred embodiment, given an exemplary threshold of 15 pixels, a value of n=2 is desirable; thus, if the pixels at y+t, y+t/2 and y+t/4 are all examined (steps 820, 824, 828) and found to be colored, an iterative test of sequential pixels is begun at y+1. A local variable i, initially set to 1 at step 832, indicates the progress of this iterative test. If the pixel at the position corresponding to y+i is uncolored (step 834), y is moved to y+i (step 836) and processing continues at step 812. If the pixel at y+i is colored, i is incremented by one (step 838) until i exceeds t (step 840). It is not necessary, however, to iteratively evaluate the pixels in a single direction beginning at y+1; instead, for example, it is possible to scan backward to y+1 from a point beyond this position (e.g., from y+t/4), and then resume forward scanning to y+t.

If all pixels from y to t are found to be colored, the vertical extent of consecutive colored pixels thus identified qualifies as a possible vertical line segment. In step 844, the thickness (i.e., horizontal span of contiguous colored pixels) of the line segment is tested at several and, if desired for maximum accuracy, all points. If the line segment does not satisfy the thickness criteria at a sufficient number of points (e.g., if the mean-squared difference from the average exceeds 1/40", that is, 5 or 6 pixels at 200 dots/inch), it is assumed to be part of a graphic feature or letter, and processing returns to step 812. Otherwise, control passes to a line-fixing procedure that follows the line both upwardly (step 848) and downwardly (step 850), recording line information such as endpoints and average thickness (step 852). Vertical scanning then continues until a new line segment is identified or the image has been fully scanned.

Figure 9:
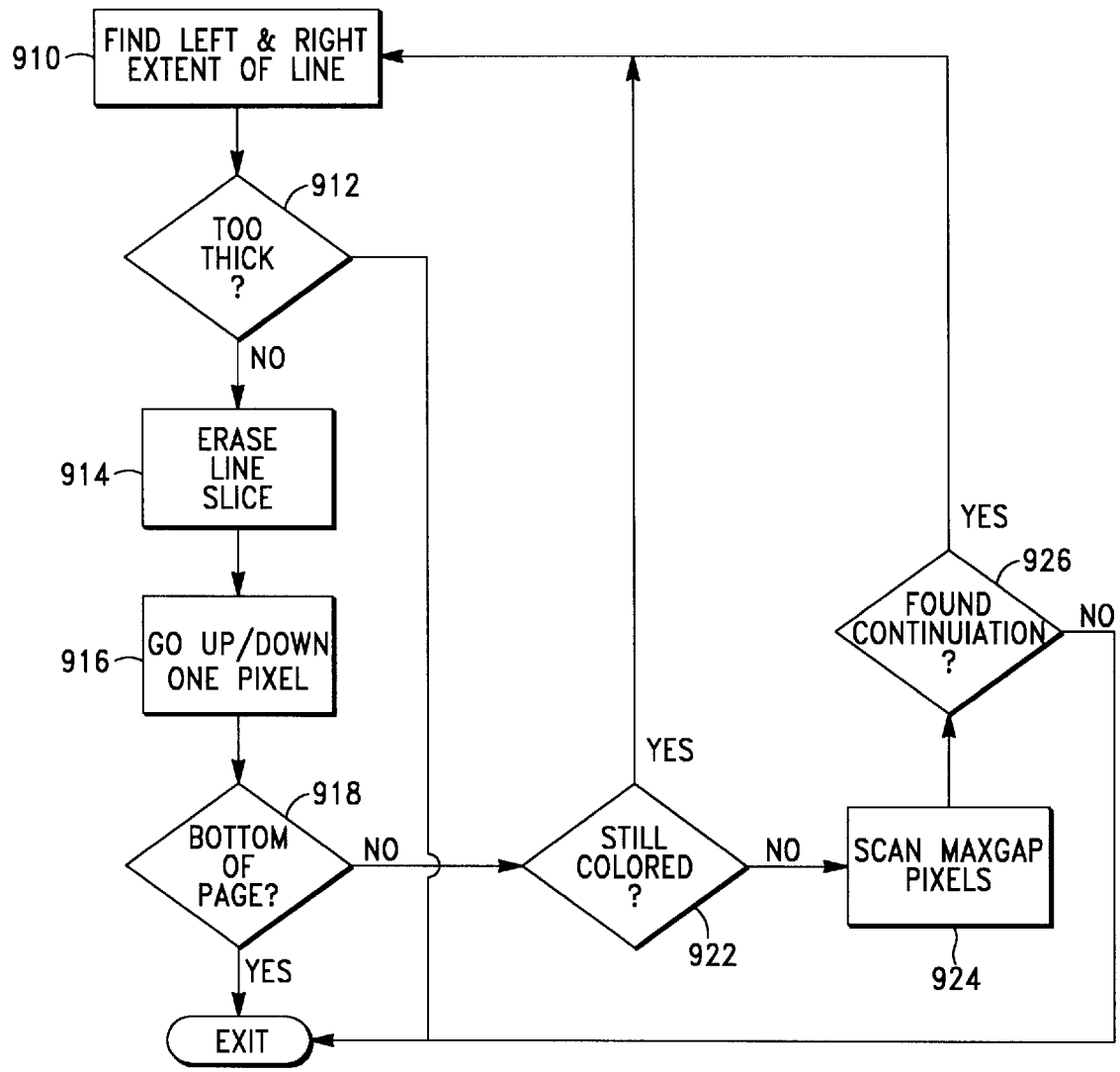
FIG. 9 is a flow chart illustrating the procedure utilized by the invention to establish vertical-line orientation and erase detected lines in preparation for redrawing.

A suitable vertical line-fixing procedure, implemented by isolation module 352, is illustrated in FIG. 9. For each identified vertical line segment, isolation module 352 first identifies the left and right boundaries of the line at each vertically contiguous pixel at step 910. If the horizontal thickness of the line defined by these boundaries exceeds a predetermined minimum, and this excess persists over a preset extent (i.e., over a run of several vertically contiguous pixels) of the vertical line (step 912), the region probably does not correspond to a vertical line and control passes back to the vertical scanning routine (which causes line-fixing to proceed in the opposite direction or, if that direction has already been fixed, records line information). If the detected thickness falls within acceptable limits, however, the vertical line slice defined by the boundaries is erased (step 914), and the next pixel in the current direction is identified (step 916). Unless this pixel coincides with the bottom of the page, in which case control returns to the vertical scanning procedure (step 918), it is examined to determine whether it is colored or uncolored (step 922). If the pixel is colored, it is treated as a possible component of the line and processed in accordance with steps 910 et seq. If the pixel is uncolored, isolation module 352 evaluates succeeding pixels to ensure that the gap is not spurious. In particular, since all horizontal lines have already been erased, the possibility of spurious gaps is increased; moreover, since a spurious gap can result from intersection with an erased horizontal line as well as scanner error, the size of the allowable gap is ordinarily increased to the maximum allowable thickness of a horizontal line. Accordingly, at step 924, isolation module 352 searches vertically in the current direction for a colored pixel that may represent continuation of the line segment. If such a pixel is found (step 926) and its thickness resembles that of the pre-gap segment, analysis engine 139 assumes it represents a continuation of the line; the gap is ignored, and processing proceeds on the the identified pixel beginning at step 910. Otherwise, control returns to the vertical scanning procedure.

With renewed reference to FIG. 3, following scanning, erasure and tabulation of all horizontal and vertical lines, the tabulated information is used to redraw the lines. Generally, for each line, the recorded average thickness is used to draw a line (i.e., a continuous band of colored pixels) of that thickness between the two endpoints. The line-fixing processes identify endpoints as the pixels midway between edge boundaries at each end of the line; thus, in the horizontal fixing procedure, the endpoints are midway between LTOP and LBOT at the terminal columns of the line.

If these points do not align with one another, a line connecting them will not be marginjustified; accordingly, properly aligned points—that is, points at the same horizontal position for vertical lines, and at the same vertical position for horizontal lines—are defined midway between the positions of the misaligned points. Alternatively, the possibility of misalignment can be eliminated by defining the positions of the endpoints with respect to the entire line, rather than the terminal line slices, by finding the midpoint of each line slice and then finding the average midpoint position across the line.

It will therefore be seen that the foregoing represents a highly efficient and advantageous approach to locating and straightening lines in digitized images. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits.

What is claimed is:

1. A method of straightening horizontal lines in an image represented as a bilevel array of colored and uncolored pixels in a computer memory, the method comprising:
   a. defining a portion of the computer memory as a rolling buffer, the rolling buffer having a storage size and being organized as a grid having a plurality of rows and columns, wherein the plurality of rows of the rolling buffer are shiftable in the vertical direction so as to track one of the horizontal lines;
   b. scanning the array for horizontal line segments, each line segment comprising a predetermined threshold number of horizontally contiguous, colored pixels and having a vertical extent of colored pixels along the segment no greater than a predetermined maximum and which extent varies no more than a predetermined amount; and
   c. straightening each horizontal line segment according to steps comprising:
      i. filling the rolling buffer with data from the computer memory corresponding to a portion of the image containing a horizontal line segment;
      ii. for a first rolling buffer column and each succeeding rolling buffer column, (a) identifying a continuous vertical extent of colored pixels, (b) identifying a top and a bottom colored pixel thereof and recording the distance therebetween, and (c) replacing the continuous vertical extent of colored pixels with uncolored pixels;
      iii. copying the contents of the rolling buffer back into the computer memory;
      iv. repeating steps i–iii using portions of the computer memory horizontally contiguous in a first horizontal direction until a first terminus of the horizontal line segment is reached;
      v. repeating steps i–iii using portions of the computer memory horizontally contiguous in a second horizontal direction until a second terminus of the horizontal line segment is reached;
      vi. recording an average distance between top and bottom pixels and a location in computer memory corresponding to each line terminus; and
      vii. drawing a line in computer memory between locations corresponding to the first and second termini and having a thickness equal to the average distance.

2. The method of claim 1 wherein each column has a vertical pixel height and, for each column succeeding a previous column, the top colored pixel is constrained to be no more than one pixel higher than the top colored pixel of the previous column, and the bottom colored pixel is constrained to be no more than one pixel lower than the bottom colored pixel of the previous column.

3. The method of claim 1 wherein each column has a vertical pixel height and base and ceiling pixels, and the step of identifying a continuous vertical extent of colored pixels comprises, for each succeeding buffer column, the substeps of:
   a. determining whether a top pixel is a ceiling pixel and, if so,
   b. rolling the buffer downward by copying into the buffer data from the computer memory corresponding to a vertically superior image portion;
   c. determining whether a bottom pixel is a base pixel and, if so,
   d. rolling the buffer upward by copying into the buffer data from the computer memory corresponding to a vertically inferior image portion.

4. The method of claim 3 wherein:
   a. the computer memory is organized as a grid having a plurality of rows and columns of pixels, the contents of the buffer corresponding to a first set of rows and a first set of columns of the computer memory; and
   b. the step of replacing the contents of the buffer with data corresponding to a vertically superior image portion comprises the steps of (i) copying the contents of the buffer back into the computer memory, and (ii) transferring to the buffer data from the first set of columns and a second set of rows, the second set of rows being located above the first set of rows by a distance equal to the vertical pixel height of the buffer less one.

5. The method of claim 3 wherein:
   a. the computer memory is organized as a grid having a plurality of rows and columns of pixels, the contents of the buffer corresponding to a first set of rows and a first set of columns of the computer memory; and
   b. the step of replacing the contents of the buffer with data corresponding to a vertically inferior image portion comprises the steps of (i) copying the contents of the buffer back into the computer memory, and (ii) transferring to the buffer data from the first set of columns and a second set of rows, the second set of rows being located below the first set of rows by a distance equal to the vertical pixel height of the buffer less one.

6. The method of claim 1 wherein different portions of the computer memory have different access times associated therewith, and the portion of the computer memory defined as the rolling buffer has an access time faster than that associated with the memory containing the image.

7. The method of claim 1 wherein a terminus is defined where the distance between top and bottom pixels is less than a predetermined minimum for at least a predetermined number of columns.

8. The method of claim 1 wherein a terminus is defined where the distance between top and bottom pixels is more than a predetermined maximum for at least a predetermined number of columns.

9. The method of claim 1 wherein a terminus is defined at an edge of the image.

10. The method of claim 1 wherein the number of columns in the buffer is equal to one byte.

11. A method of locating horizontal lines in an image represented as a bilevel array of colored and uncolored pixels in a computer memory, the memory being organized into a plurality of rows and columns defining pixel positions, the method comprising scanning a first and succeeding horizontal row of pixels for horizontal line segments, each line segment comprising a predetermined threshold number of horizontally contiguous, colored pixels and having a vertical extent of colored pixels along the segment no greater than a predetermined maximum and which extent varies no more than a predetermined amount, according to steps comprising:

a. locating an initial colored pixel at a horizontal pixel position x in a current row:

b. determining whether a threshold horizontal distance t from position x extends beyond a side of the image: and b1. in step b, if the threshold horizontal distance t from position x extends beyond a side of the image, terminating scanning in the current row:

b2. in step b, if the threshold horizontal distance t from position x does not extend beyond a side of the image, determining whether a pixel displaced horizontally from position x by the distance t is colored:

b2i. in step b2, if the pixel displaced horizontally from position x by the distance t is uncolored, defining x as x+t and repeating steps (b), (b1), (b2) and (b2i);

b2ii. in step b2. if the pixel displaced horizontally from position x by the distance t is colored, determining whether any pixels intervening between position x and x+t are uncolored:

b2ii-a. in step b2ii, if any pixels intervening between position x and x+t are uncolored; defining x as the position of an intervening uncolored pixel and repeating steps (b2i), (b2ii), and (b2ii-a);

b2ii-b. in step b2ii, if any pixels intervening between position x and x+t are colored, determining a width by scanning pixels displaced vertically from each of the pixels at positions x to x+t for continuous vertical extents of colored pixels, each such extent having a length;

c. if the vertical scan reveals fewer than a predetermined number of colored-pixel extents having lengths exceeding a threshold maximum and acceptably small variation among lengths, recording the positions x to x+t as a horizontal line segment, and terminating scanning in the current row; and d. repeating steps (a)–(c) for each succeeding row, wherein the step of determining whether any pixels intervening between positions x and x+t are uncolored comprises the step of successively examining the intervening pixels, and wherein the step of successively examining the intervening pixels comprises the steps of:

a. for n iterations,
   i. determining whether a pixel at position $x+t/2^n$ is colored; if not,
   ii. defining x as $x+t/2^n$ and repeating steps (b)–(d) of claim 10; and
   iii. if so, repeating steps (i) and (ii);

b. thereafter, if no uncolored pixels have been identified, successively examining pixels between positions x and x+t; and c. if an uncolored pixel is identified, defining x to correspond to the position of the identified uncolored pixel.

12. The method of claim 11 wherein n=2.

13. A method of locating vertical lines in an image represented as a bilevel array of colored and uncolored pixels in a computer memory, the memory being organized into a plurality of columns and rows, including top and bottom rows, defining pixel positions, the method comprising scanning a first and succeeding vertical column of pixels for vertical line segments, each line segment comprising a predetermined threshold number of vertically contiguous, colored pixels and having a horizontal extent of colored pixels alone the segment no greater than a predetermined maximum and which extent varies no more than a predetermined amount, according to steps comprising:

a. locating an initial colored pixel at a vertical pixel position y in a current column, b. determining whether a threshold vertical distance t from position y extends beyond the top or bottom pixel row, and b1. in step b, if the threshold vertical distance t from position v extends beyond the top or bottom pixel row, terminating scanning in the current column:

b2. in step b, if the threshold vertical distance t from position y does not extend beyond the top or bottom pixel row, determining whether a pixel displaced vertically from position y by the distance t is colored;

b2i. in step b2, if the pixel displaced vertically from position y by the distance t is uncolored, defining y as y+t and repeating steps (b), (b1), (b2), and (b2i):

b2ii. in step b2, if the pixel displaced vertically from position y by the distance t is colored, determining whether any pixels intervening between position y and y+t are uncolored:

b2ii-a. in step b2ii. if any pixels intervening between position y and y+t are uncolored, defining y as the position of an intervening uncolored pixel and repeating steps (b2i), (b2ii) and (b2ii-a);

b2ii-b in step b2ii, if any pixels intervening between position y and y+t are colored, determining a width by scanning pixels displaced horizontally from each of the pixels at positions y to y+t for continuous horizontal extents of colored pixels, each such extent having a length;

c. if the horizontal scan reveals fewer than a predetermined number of colored-pixel extents having lengths exceeding a threshold maximum and acceptably small variation among lengths, recording the positions y to y+t as a vertical line segment, and terminating scanning in the current column, and d. repeating steps (a)–(c) for each succeeding column, wherein the step of determining whether any pixels intervening between positions y and y+t are uncolored comprises the step of successively examining the intervening pixels, wherein the step of successively examining the intervening pixels comprises the steps of:

a. for n iterations,
   i. determining whether a pixel at position $y+t/2^n$ is colored; if not,
   ii. defining y as $y+t/2^n$ and repeating steps (b)–(d) of claim 11; and
   iii. if so, repeating steps (i) and (ii);

b. thereafter, if no uncolored pixels have been identified, successively examining pixels between positions y and y+t; and c. if an uncolored pixel is identified, defining y to correspond to the position of the identified uncolored pixel.

14. The method of claim 13 wherein n=2.

15. A method of detecting and straightening horizontal and vertical lines in an image represented as a bilevel array of colored and uncolored pixels in a computer memory, the memory being organized into a plurality of rows and columns defining pixel positions, the method comprising:

a. scanning a first and succeeding horizontal row of pixels for horizontal line segments, each line segment comprising a predetermined threshold number of horizontally contiguous, colored pixels and determining a vertical extent of colored pixels along the segment no greater than a predetermined maximum and which extent varies no more than a predetermined amount;

b. scanning a first and succeeding vertical column of pixels for vertical line segments, each line segment comprising a predetermined threshold number of vertically contiguous, colored pixels and determining a horizontal extent of colored pixels along the segment no greater than a predetermined maximum and which extent varies no more than a predetermined amount;

c. characterizing a line associated with each vertical and horizontal line segment, each characterized line being at least as long as the associated segment and having a pair of termini; and d. straightening each characterized line.

16. The method of claim 15 wherein each vertical line is straightened according to steps comprising:

a. recording an average number of colored pixels horizontally and contiguously adjacent to each colored pixel between the line termini; and b. drawing a line between locations corresponding to the first and second termini and having a thickness equal to the average distance.

17. The method of claim 15 wherein each horizontal line is straightened according to steps comprising:

a. recording an average number of colored pixels vertically and contiguously adjacent to each colored pixel between the line termini; and b. drawing a line between locations corresponding to the first and second termini and having a thickness equal to the average distance.

18. Apparatus for digitally representing images, analyzing such images for horizontal lines and processing the images so as to straighten the horizontal lines, the apparatus comprising:

a. a processor;

b. a first computer memory, accessible to the processor, for storing an image as a bilevel array of colored and uncolored pixels;

c. a second computer memory, accessible to the processor, for storing a variable portion of the image, the second computer memory having a storage size and being organized as a grid having a plurality of rows and columns, wherein said second computer memory comprises a rolling memory, and wherein the variable portion of the image is shiftable in the vertical direction so as to track one of the horizontal lines; and d. a prescanning module configured to identify horizontal line segments;

e. an isolation module configured to characterize horizontal lines containing line segments identified by the prescanning module, the isolation module causing the processor to:

i. fill the second computer memory with data from the first computer memory corresponding to a portion of the image containing a horizontal line segment;

ii. for a first buffer column and each succeeding buffer column, (a) identify a continuous vertical extent of colored pixels, (b) identify a top and a bottom colored pixel thereof and record the distance therebetween, and (c) replace the continuous vertical extent of colored pixels with uncolored pixels;

iii. copy the contents of the first computer memory back into the second computer memory;

iv. repeat i–iii using portions of the second computer memory horizontally contiguous in a first horizontal direction until a first terminus of the horizontal line segment is reached;

v. repeat i–iii using portions of the second computer memory horizontally contiguous in a second horizontal direction until a second terminus of the horizontal line segment is reached; and vi. record, in the first computer memory, an average distance between top and bottom pixels and a location in the first computer memory corresponding to each line terminus;

f. a line-drawing module configured to draw, for each line characterized by the isolation module, a straight line in the first computer memory between locations corresponding to the first and second termini of the characterized line, the straight line having a thickness equal to the average distance between top and bottom pixels for the characterized line.

19. The apparatus of claim 18 wherein the first computer memory is accessible to the processor across a system bus and the second computer memory is directly accessible to the processor.

20. The apparatus of claim 18 wherein the isolation module defines a terminus where the distance between top and bottom pixels is less than a predetermined minimum for at least a predetermined number of columns.

21. The apparatus of claim 18 wherein the isolation module defines a terminus where the distance between top and bottom pixels is more than a predetermined maximum for at least a predetermined number of columns.

22. The apparatus of claim 18 wherein the isolation module defines a terminus at an edge of the image.

23. The apparatus of claim 18 wherein the number of columns in the buffer is equal to one byte.

24. A system for digitizing images and for detecting and straightening horizontal and vertical lines therein, the system comprising:

a. a processor;

b. a computer memory, accessible to the processor, for storing an image as a bilevel array of colored and uncolored pixels, the computer memory being organized into a plurality of columns and rows defining pixel positions;

c. a scanner for converting an input image into electrical signals;

d. means, coupled to the scanner, for causing the processor to represent the image in the computer memory as a bilevel array of colored and uncolored pixels in accordance with the electrical signals;

e. means for causing the processor to scan a first and succeeding horizontal row of pixels for horizontal line segments, each line segment comprising a predetermined threshold number of horizontally contiguous, colored pixels and determining a vertical extent of colored pixels along the segment no greater than a predetermined maximum and which extent varies no more than a predetermined amount;

f. means for causing the processor to scan a first and succeeding vertical column of pixels for vertical line segments, each line segment comprising a predetermined threshold number of vertically contiguous, colored pixels and having a horizontal extent of colored pixels along the segment no greater than a predetermined maximum and which extent varies no more than a predetermined amount;

g. means for characterizing a line associated with each vertical and horizontal line segment, each characterized line being at least as long as the associated segment and having a pair of termini; and h. means for straightening each characterized line.

25. The apparatus of claim 24 the line-straightening means straightens vertical lines by:

a. recording an average number of colored pixels horizontally and contiguously adjacent to each colored pixel between the line termini; and b. drawing a line in the computer memory between locations corresponding to the first and second termini and having a thickness equal to the average distance.

26. The apparatus of claim 24 wherein the line-straightening means straightens horizontal lines by:

a. recording an average number of colored pixels vertically and contiguously adjacent to each colored pixel between the line termini; and b. drawing a line in the computer memory between locations corresponding to the first and second termini and having a thickness equal to the average distance.

27. A method of locating vertical lines in an image represented as a bilevel array of colored and uncolored pixels in a computer memory, the memory being organized into a plurality of columns and rows, including top and bottom rows, defining pixel positions, the method comprising scanning a first and succeeding vertical column of pixels for vertical line segments, each line segment comprising a predetermined threshold number of vertically contiguous, colored pixels and having a horizontal extent of colored pixels along the segment no greater than a predetermined maximum and which extent varies no more than a predetermined amount, according to steps comprising:

a. locating an initial colored pixel at a vertical pixel position y in a current column;

b. determining whether a threshold vertical distance t from position y extends beyond the top or bottom pixel row, and b1. in step b, if the threshold vertical distance t from position y extends beyond the top or bottom pixel row, terminating scanning in the current column;

b2. in step b, if the threshold vertical distance t from position y does not extend beyond the top or bottom pixel row, determining whether a pixel displaced vertically from position y by the distance t is colored;

b2i. in step b2, if the pixel displaced vertically from position y by the distance t is uncolored, defining y as y+t and repeating steps (b), (b1), (b2), and (b2i);

b2ii. in step b2, if the pixel displaced vertically from position y by the distance t is colored, determining whether any pixels intervening between position y and y+t are uncolored;

b2ii-a. in step b2ii, if any pixels intervening between position y and y+t are uncolored, defining y as the position of an intervening uncolored pixel and repeating steps (b2i), (b2ii) and (b2ii-a);

b2ii-b in step b2ii, if any pixels intervening between position y and y+t are colored, determining a width by scanning pixels displaced horizontally from each of the pixels at positions y to y+t for continuous horizontal extents of colored pixels, each such extent having a length;

c. if the horizontal scan reveals fewer than a predetermined number of colored-pixel extents having lengths exceeding a threshold maximum and acceptably small variation among lengths, recording the positions y to y+t as a vertical line segment, and terminating scanning in the current column; and d. repeating steps (a)–(c) for each succeeding column.

28. The method of claim 27 wherein the step of determining whether any pixels intervening between positions y and y+t are uncolored comprises the step of successively examining the intervening pixels.

29. The method of claim 27 further comprising the step of characterizing a line associated with each recorded vertical line segment, each characterized line being at least as long as the vertical line segment and having a pair of termini.

30. The method of claim 29 wherein the step of characterizing a line comprises the steps of:

a. beginning with an initial colored pixel of a recorded vertical line segment, i. searching in a first vertical direction for an uncolored line-segment pixel or a colored line-segment pixel having a number of colored pixels horizontally and contiguously adjacent thereto in excess of a predetermined maximum or less than a predetermined minimum;

ii. defining the line-segment pixel as a line terminus; and b. repeating step (a) for all colored pixels vertically adjacent to the initial pixel.

31. The method of claim 30 further comprising the step of straightening each characterized line according to steps comprising:

a. recording an average number of colored pixels horizontally and contiguously adjacent to each colored pixel between the line termini; and b. drawing a line between locations corresponding to the first and second termini and having a thickness equal to the average distance.

32. A method of locating horizontal lines in an image represented as a bilevel array of colored and uncolored pixels in a computer memory, the memory being organized into a plurality of rows and columns defining pixel positions, the method comprising scanning a first and succeeding horizontal row of pixels for horizontal line segments, each line segment comprising a predetermined threshold number of horizontally contiguous, colored pixels and having a vertical extent of colored pixels along the segment no greater than a predetermined maximum and which extent varies no more than a predetermined amount, according to steps comprising:

a. locating an initial colored pixel at a horizontal pixel position x in a current row;

b. determining whether a threshold horizontal distance t from position x extends beyond a side of the image; and b1. in step b, if the threshold horizontal distance t from position x extends beyond a side of the image, terminating scanning in the current row;

b2. in step b, if the threshold horizontal distance t from position x does not extend beyond a side of the image, determining whether a pixel displaced horizontally from position x by the distance t is colored;

b2i. in step b2, if the pixel displaced horizontally from position x by the distance t is uncolored, defining x as x+t and repeating steps (b), (b1), (b2) and (b2i);

b2ii. in step b2, if the pixel displaced horizontally from position x by the distance t is colored, determining whether any pixels intervening between position x and x+t are uncolored;

b2ii-a. in step b2ii, if any pixels intervening between position x and x+t are uncolored; defining x as the position of an intervening uncolored pixel and repeating steps (b2i), (b2ii), and (b2ii-a);

b2ii-b. in step b2ii, if any pixels intervening between position x and x+t are colored, determining a width by scanning pixels displaced vertically from each of the pixels at positions x to x+t for continuous vertical extents of colored pixels, each such extent having a length;

c. if the vertical scan reveals fewer than a predetermined number of colored-pixel extents having lengths exceeding a threshold maximum and acceptably small variation among lengths, recording the positions x to x+t as a horizontal line segment, and terminating scanning in the current row; and d. repeating steps (a)–(c) for each succeeding row.

33. The method of claim 32 wherein the step of determining whether any pixels intervening between positions x and x+t are uncolored comprises the step of successively examining the intervening pixels.

34. The method of claim 32 further comprising the step of characterizing a line associated with each recorded horizontal line segment, each characterized line being at least as long as the horizontal line segment and having a pair of termini.

35. Apparatus for digitally representing images and analyzing such images for vertical lines, the apparatus comprising:

a. a processor;

b. a computer memory, accessible to the processor, for storing an image as a bilevel array of colored and uncolored pixels, the computer memory being organized into a plurality of columns and rows, including top and bottom rows, defining pixel positions; and c. an analysis engine configured to locate vertical lines by causing the processor to scan a first and succeeding vertical column of pixels for vertical line segments, each line segment comprising a predetermined threshold number of vertically contiguous, colored pixels and having a horizontal extend of colored pixels along the segment no greater than a predetermined maximum and which extent varies no more than a predetermined amount, by:

i. locating an initial colored pixel at a vertical pixel position y in a current column;

ii. determining whether a threshold vertical distance t from position y extends beyond the top or bottom pixel row, ii-1 in step ii, if the threshold vertical distance t from position y extends beyond the top or bottom pixel row, terminating scanning in the current column;

ii-2 in step ii, if the threshold vertical distance t from position y does not extend beyond the top or bottom pixel row, determining whether a pixel displaced vertically from position y by the distance t is colored;

ii-2-a. in step ii-2, if the pixel displaced vertically from position y by the distance t is uncolored, defining y as y+t and repeating (ii), (ii-1), (ii-2), and (ii-2-a);

ii-2-b. in step ii-2, if the pixel displaced vertically from position y by the distance t is colored, determining whether any pixels intervening between position y and y+t are uncolored;

ii-2-b-1. in step ii-2-b, if any pixels intervening between position y and y+t are uncolored, defining y as the position of an intervening uncolored pixel and repeating (ii-2-a), (ii-2-b), and (ii-2-b-1);

ii-2-b-2. in step ii-2-b, if any pixels intervening between position y and y+t are colored, determining a width by scanning pixels displaced horizontally from each of the pixels at positions y to y+t for continuous horizontal extents of colored pixels, each such extent having a length;

iii. if the horizontal scan reveals fewer than a predetermined number of colored-pixel extents having lengths exceeding a threshold maximum and acceptably small variation among lengths, recording the positions y to y+t as a vertical line segment, and terminating scanning in the current column; and iv. repeating (i)–(iii) for each succeeding column.

36. The apparatus of claim 35 wherein analysis engine causes the processor to successively examine pixels intervening between positions y and y+t in order to determine whether any of the pixels is uncolored.

37. The apparatus of claim 35 further comprising a line-drawing module for straightening vertical lines located by the analysis engine by (a) identifying, for each located vertical line, a pair of termini and an average thickness, and (b) drawing a line of colored pixels in the computer memory between memory locations corresponding to the first and second termini and having a thickness, in pixels, equal to the average distance.

38. Apparatus for digitally representing images and analyzing such images for horizontal lines, the apparatus comprising:

a. a processor;

b. a computer memory, accessible to the processor, for storing an image as a bilevel array of colored and uncolored pixels, the computer memory being organized into a plurality of columns and rows, including top and bottom rows, defining pixel positions; and c. an analysis engine configured to locate horizontal lines by causing the processor to scan a first and succeeding horizontal column of pixels for horizontal line segments, each line segment comprising a predetermined threshold number of horizontally contiguous, colored pixels and having a horizontal extent of colored pixels along the segment no greater than a predetermined maximum and which extent varies no more than a predetermined amount, by:

i. locating an initial colored pixel at a horizontal pixel position x in a current row;

ii. determining whether a threshold horizontal distance t from position x extends beyond a side of the image, ii-a in step ii, if the threshold horizontal distance t from position x extends beyond a side of the image, terminating scanning in the current row;

ii-b in step ii, if the threshold horizontal distance t from position x does not extend beyond a side of the image, determining whether a pixel displaced horizontally from position x by the distance t is colored;

ii-b-1 in step ii-b, if the pixel displaced horizontally from position x by the distance t is uncolored, defining x as x+t and repeating (ii), (ii-a), (ii-b), and (ii-b-1);

ii-b-2 in step ii-b, if the pixel displaced horizontally from position x by the distance t is colored, determining whether any pixels intervening between position x and x+t are uncolored;

ii-b-2-a. in step ii-b-2, if any pixels intervening between position x and x+t are uncolored, defining x as the position of an intervening uncolored pixel and repeating (ii-b-1), (ii-b-2), and (ii-b-2-a);

ii-b-2-b. in step ii-b-2, if any pixels intervening between position x and x+t are colored, determining a width by scanning pixels displaced vertically from each of the pixels at positions x to x+t for continuous vertical extents of colored pixels, each such extent having a length;

iii. if the vertical scan reveals fewer than a predetermined number of colored-pixel extents having lengths exceeding a threshold maximum and acceptably small variation among lengths, recording the positions x to x+t as a horizontal line segment, and terminating scanning in the current row; and iv. repeating (i)–(iii) for each succeeding row.

39. The apparatus of claim 38 wherein the analysis engine causes the processor to successively examine pixels intervening between positions x and x+t in order to determine whether any of the pixels is uncolored.

40. The apparatus of claim 38 further comprising a line-drawing module for straightening vertical lines located by the analysis engine by (a) identifying, for each located horizontal line, a pair of termini and an average thickness, and (b) drawing a line of colored pixels in the computer memory between memory locations corresponding to the first and second termini and having a thickness, in pixels, equal to the average distance.

41. A method of straightening lines in a scanning direction in an image represented as a bilevel array of colored and uncolored pixels in a computer memory, the method comprising:

a. defining a portion of the computer memory as a rolling buffer, the buffer having a storage size and being organized as a grid having a plurality of rows and columns, wherein the plurality of rows of the rolling buffer are shiftable in a subscanning direction so as to track one of the lines in the scanning direction;

b. scanning the array for line segments in the scanning direction, each line segment comprising a predetermined threshold number of contiguous in the scanning direction, colored pixels and having an extent in the subscanning direction of colored pixels along the segment no greater than a predetermined maximum and which extent varies no more than a predetermined amount; and c. straightening each line segment in the scanning direction according to steps comprising:

i. filling the rolling buffer with data from the computer memory corresponding to a portion of the image containing a line segment in the scanning direction;

ii. for a first buffer column and each succeeding buffer column, (a) identifying a continuous extent in the subscanning direction of colored pixels, (b) identifying a top and a bottom colored pixel thereof and recording the distance therebetween, and (c) replacing the continuous extent in the subscanning direction of colored pixels with uncolored pixels;

iii. copying the contents of the buffer back into the computer memory;

iv. repeating steps i–iii using portions of the computer memory horizontally contiguous in a first scanning direction until a first terminus of the line segment in the scanning direction is reached;

v. repeating steps i–iii using portions of the computer memory horizontally contiguous in a second scanning direction until a second terminus of the line segment in the scanning direction is reached;

vi. recording an average distance between top and bottom pixels and a location in computer memory corresponding to each line terminus; and vii. drawing a line in computer memory between locations corresponding to the first and second termini and having a thickness equal to the average distance.

42. A method of detecting and straightening lines in a scanning and a subscanning direction in an image represented as a bilevel array of colored and uncolored pixels in a computer memory, the memory being organized into a plurality of rows and columns defining pixel positions, the method comprising:

a. scanning a first and succeeding row of pixels in the scanning direction for line segments in the scanning direction, each line segment comprising a predetermined threshold number of contiguous, colored pixels in the scanning direction and determining an extent in the subscanning direction of colored pixels along the segment no greater than a predetermined maximum and which extent varies no more than a predetermined amount;

b. scanning a first and succeeding column of pixels in the subscanning direction for line segments in the subscanning direction, each line segment comprising a predetermined threshold number of contiguous, colored pixels in the subscanning direction and determining an extent in the scanning direction of colored pixels along the segment no greater than a predetermined maximum and which extent varies no more than a predetermined amount;

c. characterizing a line associated with each line segment in the scanning and subscanning directions, each characterized line being at least as long as the associated segment and having a pair of termini; and d. straightening each characterized line.

43. Apparatus for digitally representing images, analyzing such images for lines in a scanning direction and processing the images so as to straighten the lines in the scanning direction, the apparatus comprising:

a. a processor;

b. a first computer memory, accessible to the processor, for storing an image as a bilevel array of colored and uncolored pixels;

c. a second computer memory, accessible to the processor, for storing a variable portion of the image, the second computer memory having a storage size and being organized as a grid having a plurality of rows and columns, wherein said second computer memory comprises a rolling memory, and wherein the variable portion of the image is shiftable in a subscanning direction so as to track one of the lines in the scanning direction; and d. a prescanning module configured to identify line segments in the scanning direction;

e. an isolation module configured to characterize lines in the scanning direction containing line segments identified by the prescanning module, the isolation module causing the processor to:

i. fill the second computer memory with data from the first computer memory corresponding to a portion of the image containing a line segment in the scanning direction;

ii. for a first buffer column and each succeeding buffer column, (a) identify a continuous extent of colored pixels in the subscanning direction, (b) identify a top and a bottom colored pixel thereof and record the distance therebetween, and (c) replace the continuous extent of colored pixels in the subscanning direction with uncolored pixels;

iii. copy the contents of the first computer memory back into the second computer memory;

iv. repeat i–iii using portions of the second computer memory contiguous in a first scanning direction until a first terminus of the line segment in the scanning direction is reached;

v. repeat i–iii using portions of the second computer memory contiguous in a second scanning direction until a second terminus of the line segment in the scanning direction is reached; and vi. record, in the first computer memory, an average distance between top and bottom pixels and a location in the first computer computer memory corresponding to each line terminus;

f. line-drawing module configured to draw, for each line characterized by the isolation module, a straight line in the first computer memory between locations corresponding to the first and second termini of the characterized line, the straight line having a thickness equal to the average distance between top and bottom pixels for the characterized line.

44. A system for digitizing images and for detecting and straightening lines in a scanning direction and a subscanning direction therein, the system comprising:

a. a processor;

b. a computer memory, accessible to the processor, for storing an image as a bilevel array of colored and uncolored pixels, the computer memory being organized into a plurality of columns and rows defining pixel positions;

c. a scanner for converting an input image into electrical signals;

d. means, coupled to the scanner, for causing the processor to represent the image in the computer memory as a bilevel array of colored and uncolored pixels in accordance with the electrical signals;

e. means for causing the processor to scan a first and succeeding row of pixels in the scanning direction for line segments in the scanning direction, each line segment comprising a predetermined threshold number of contiguous, colored pixels in the scanning direction and determining an extent in the subscanning direction of colored pixels along the segment no greater than a predetermined maximum and which extent varies no more than a predetermined amount;

f. means for causing the processor to scan a first and succeeding column of pixels in the subscanning direction for line segments in the subscanning direction, each line segment comprising a predetermined threshold number of contiguous, colored pixels in the subscanning direction and having an extent of colored pixels in the scanning direction along the segment no greater than a predetermined maximum and which extent varies no more than a predetermined amount;

g. means for characterizing a line associated with each line segment in the scanning and subscanning directions, each characterized line being at least as long as the associated segment and having a pair of termini; and h. means for straightening each characterized line.

* * * * *

UNITED STATES PATENT AND TRADEMARK OFFICE
CERTIFICATE OF CORRECTION

PATENT NO. : 5,835,640
DATED : November 10, 1998
INVENTOR(S) : John Clements

It is certified that error appears in the above-identified patent and that said Letters Patent is hereby corrected as shown below:

Column 13, line 53, change "a." to --1a.--.

line 57, delete "of claim 10".

line 60, change "b." to --1b.--.

line 63, change "c." to --1c.--.

Column 14, line 17, change "v" to --y--.

Column 23, line 24, change "first computer computer" to --first computer--.

Signed and Sealed this

First Day of June, 1999

Attest:

Q. TODD DICKINSON

*Attesting Officer*     Acting Commissioner of Patents and Trademarks